July 14, 1959   F. ALVAREZ SABATER   2,894,427
PHOTOGRAPHIC APPARATUS FOR TAKING AND PROJECTING
PICTURES WITH COLOR SEPARATION
Filed Jan. 3, 1956   2 Sheets-Sheet 1

United States Patent Office 2,894,427
Patented July 14, 1959

2,894,427

PHOTOGRAPHIC APPARATUS FOR TAKING AND PROJECTING PICTURES WITH COLOR SEPARATION

Fernando Alvarez Sabater, Caracas, Venezuela

Application January 3, 1956, Serial No. 557,134

3 Claims. (Cl. 88—16.4)

The present invention relates to photography and more particularly to optical apparatus for taking, reproducing, viewing and projecting color pictures.

Photographic apparatus for color photography using black and white film has heretofore been proposed. In such systems, a plurality of separate transparencies are made simultaneously on black and white film, using a different color filter for each transparency so that there is one transparency for each of several primary colors. By projecting all of these transparencies simultaneously through correspondingly colored filters and recombining them, a picture in color can be reconstructed. Such a system has important advantages in that it permits the use of cheaper black and white film and quicker and less expensive developing and printing processes instead of the more expensive "color" film. However, it has not come into commercial use because of technical difficulties that have been encountered. Chief among these has been the phenomenon of parallax error which has resulted in poor definition, haziness and objectionable color fringes in pictures produced by this system. While certain prior patents have recognized the problem of parallax and have sought to mitigate its effects none has professed to provide a complete solution.

It is an object of the present invention to provide an improved system of photography for producing color separation, for example to reproduce color pictures by the use of black and white film, which is free from parallax effects. In accordance with the present invention, it is possible to achieve clear, sharp, color pictures free from objectionable color fringes. The invention is applicable to various fields of color photography. For example it permits the production of color motion pictures with standard black and white film using only the same amount of such film as is now used for black and white pictures. The invention is also applicable to reproduction of color "stills" by use of slides or transparencies of black and white film. Likewise black and white prints produced by the system in accordance with the invention can be used in making plates or mats for use in color printing. Apparatus in accordance with the invention can also be used for copying motion pictures or stills by means of two methods. From black and white pictures obtained in accordance with the invention color prints can be made on usual color film or paper. Conversely, black and white prints with color separation can be made from conventional color pictures.

The nature, objects and advantages of the invention will be more fully understood from the following description and claims in conjunction with the accompanying drawings which illustrate preferred embodiments of the invention.

Figure 1:
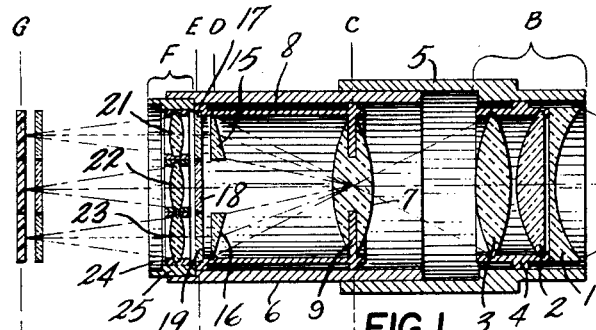
Fig. 1 is a schematic longitudinal section of apparatus in accordance with the invention.

The photographic system illustrated in the drawings can be used for taking color pictures on black and white film or for reproducing, viewing or projecting such pictures. For convenience of terminology, the apparatus will be described in terms of a camera, it being understood however, that the same optical system is also applicable to projecting, viewing and copying equipment.

The apparatus in accordance with the invention illustrated schematically in Fig. 1 comprises an objective lens unit B, an optical receiving medium C, a light divider D, a set of monocromatic filters E and a second objective lens unit F.

The lens unit B is an anamorphic objective lens unit which is shown schematically in simplified form as comprising a plano-concave cylindrical lens 1, a plano-convex cylindrical lens 2, and a bi-convex spherical lens 3 all mounted in a tubular housing 4 which is adjustable axially in an outer housing 5. The outer housing 5 is preferably adjustable in an axial direction in a main housing 6. The anamorphic objective lens unit B is thus adjustable axially so as to be focused on a scene or object A being photographed and to project a focused image of the object on the optical receiving medium C positioned at the focus of the lens unit B. By reason of the anamorphic qualities of the objective lens unit B, the image is compressed so that an object having the shape and proportions shown in Fig. 2A produces an image having the appearance shown in Fig. 2C. In the embodiment illustrated the ratio of compression of the image in a vertical direction is 3 to 1 so that the image is one third its normal height.

The optical receiving medium C is shown in Fig. 1 as a bi-convex lens 7 mounted in a tubular housing 8 which is axially adjustable in the main housing 6. The lens 7 is preferably provided with an opaque frame 9 having an opening 10 which defines the shape and size of a transparent portion of the lens 7 which preferably is just large enough to receive an image of the desired size. The frame 9 is provided in any suitable manner, for example by using a coating, layer or sheet of opaque material, for example metal. In the preferred embodiment illustrated in Fig. 1, the opaque frame 9 is incorporated in the bi-convex lens 7, for example by being molded into the lens or by using a compound lens with the opaque frame sandwiched between two parts of the lens. For the sake of clarity, the thickness of the lens and of the frame 9 has been exaggerated. The frame 9 may be quite thin consisting only of a thin layer or coating imbedded in the lens or provided on a surface of the lens. Alternatively, the lens may be cut to the shape of the opening 10 of the frame 9 and set in the frame opening. The anamorphic lens unit B and the bi-convex lens 7 of the optical receiving medium C are adjusted axially so that the lens 7 is positioned at the focus of the objective lens unit B and an image 11 of the object A is projected in the lens 7 so as to appear in the opening 10 of the frame 9 as illustrated in Fig. 2C and hence in the center of the lens 7.

The light divider D and filters E are also shown mounted in the housing 8 although they can, if desired, be in separate coaxial housing sections. The purpose of the light divider D is to divide light from the image 11 in the optical receiving medium C so that a plurality of like images 12, 13 and 14 are projected by the second objective lens unit F on to a film or other photographic medium G as shown in Fig. 2G. In Fig. 1, the light divider D is shown as comprising prisms 15 and 16 which are spaced apart and are arranged to divide the light beam from the image 11 in the optical receiving medium C into three separate beams, each providing a like image. The prisms deflect the optical axis of the light beams and avoid the bands of color which would otherwise form around the picture upon being projected.

The filter unit E comprises a plurality of mono-chromatic filters so arranged that each of the light beams resulting from the light divider D, passes through a separate color filter. As illustrated in Figs. 1 and 2E, there are three filter portions 17, 18 and 19 which may for example be red, green and blue, respectively. Thus, light transmitted by the prisms 15 and 16 will go through portions 17 and 19 of the filter while light passing through the space between the prisms will go through the central portion 18 of the filter.

Figure 4:
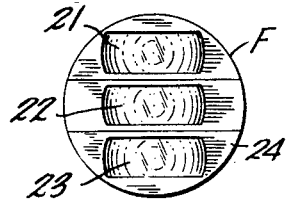
Fig. 4 is a transverse view showing a preferred embodiment of the unit F in Fig. 1.

The second objective lens unit F is shown in Fig. 1 as comprising three parallel lens units 21, 22 and 23, each having a holder 24 and all mounted in a housing 25 set into a recessed end portion of the main housing 6. While the lenses 21, 22 and 23 may be circular, they are preferably of a segmental shape as illustrated in Fig. 4 in order to have a larger light transmitting area. The lens unit F is focused on the image 11, Fig. 2C, of the optical receiving medium C and on film G held by a suitable film holder so that the lenses of the unit F "see" the image 11 of the optical receiving medium through the filter unit E and the light divider D and project on the film G juxtaposed images 12, 13 and 14 (2G) which are like the image 11 on the optical receiving medium C and are exactly alike one another except for different shading representing different color values by reason of the filters 17, 18 and 19. Each of the lenses 21, 22 and 23 or at least the central lens 22 is preferably individually adjustable so that each of the images 12, 13 and 14 is sharply focused despite the fact that the light path for images 12 and 14 is longer than that for image 13. All of the objective lens units 21, 22 and 23 of the lens assembly F see exactly the same image, namely the flat image 11 produced on the optical receiving medium C. Hence, except for the different color values resulting from the respective filters 17, 18 and 19, the images 12, 13 and 14 produced on the film G are all exactly alike and when recombined, for example by being viewed or projected through an optical system in accordance with the invention, produce a clear, sharp color picture free from objectionable parallax effects.

The film G is "black and white" film or paper, for example, panchromatic film. The different color values of the respective images 12, 13 and 14 will be represented by different densities by reason of the respective color transmitting characteristics of the filters 17, 18 and 19. The images 12, 13 and 14 on the film retained the proportions of the image 11 on the optical receiving medium C and are thus compressed in a vertical direction so that all three of images on the film occupy only the space that would normally be occupied by a single frame. Each of the images extends the full width of the film except for the space required for perforations 27 and a sound track 28. As the images are thus compressed in only one direction and occupy the full usable width of the film, sharper definition is obtained than if the frames were reduced in both dimensions.

Regardless of the depth of the scene or object A being photographed, the picture-taking objective lens unit F always sees only the flat image 11 produced on the optical receiving medium C. The three color separation images 12, 13 and 14 are thus produced from the single flat image 11. The images 12, 13 and 14 are hence exactly alike except for different color values and are sharply defined without any "fringe" effects. The serious problem of parallax effects which have heretofore plagued experts in the photographic field is thereby overcome.

Figure 2:
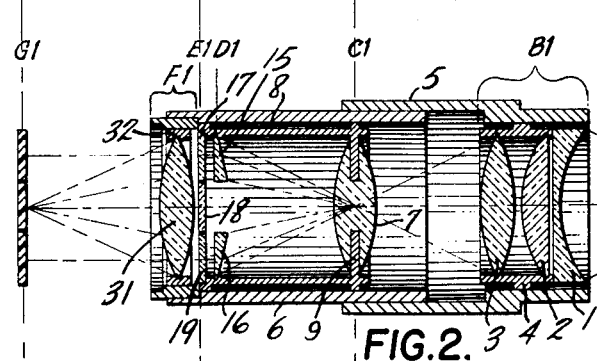
Fig. 2 is a similar view of another embodiment of the invention.
Figures 2C, 2E, 2G:
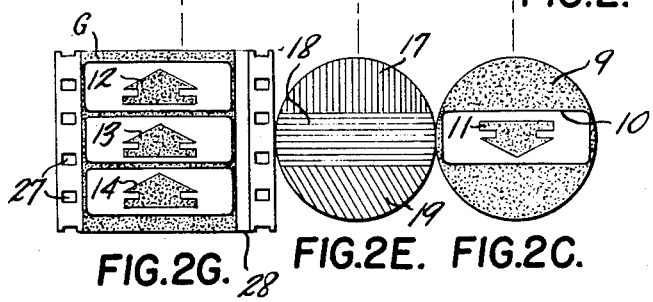
Figs. 2A, 2C, 2E and 2G are transverse views of parts designated A, C, E, and G, respectively in Fig. 1, such views being taken perpendicular to the longitudinal axis of the apparatus.
Figure 2A:
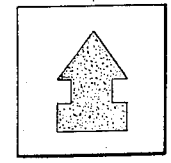

The embodiment of the invention shown in Fig. 2 comprises an anamorphic objective lens unit B1, an optical receiving medium C1, a light divider D1, a set of monochromatic filters E1 and a second objective lens unit F1. The construction and operation of these units is the same as the corresponding units of Fig. 1 except that the second objective lens unit F1 comprises a single objective lens 31 mounted in a suitable holder 32. While the use of separate lenses 21, 22 and 23 as illustrated in Figs. 1 and 4 is preferred, the single lens 31 of Fig. 2 provides a simpler and generally satisfactory alternative construction. The operation of the embodiment of Fig. 2 is the same as that of Fig. 1.

Figure 3:
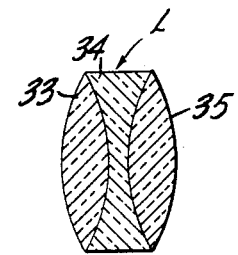
Fig. 3 is an axial section of a compound lens which may be used for the lenses shown schematically in Figs. 1 and 2 as simple bi-convex lenses.

While for the sake of simplicity of illustration, lenses have been shown schematically in Figs. 1 and 2 as simple lenses, it will be understood that it is ordinarily desirable to use compound lenses in accordance with standard optical practice to avoid color aberration and other optical defects. By way of example in Fig. 3 there is shown a compound lens L comprising elements 33, 34 and 35. As such lenses are well known in the optical industry, further description is unnecessary.

Figure 5:
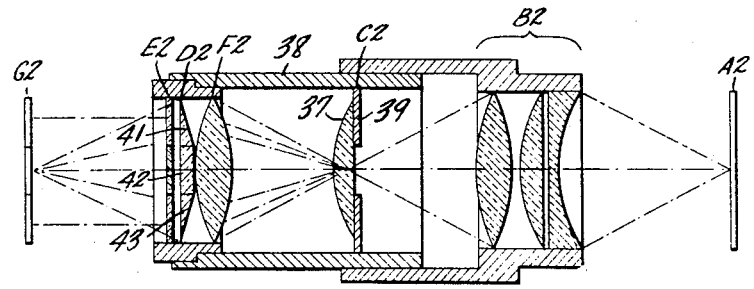
Figs. 5, 6 and 7 are schematic longitudinal sections similar to Figs. 1 and 2 showing further embodiments of the invention.
Figure 6:
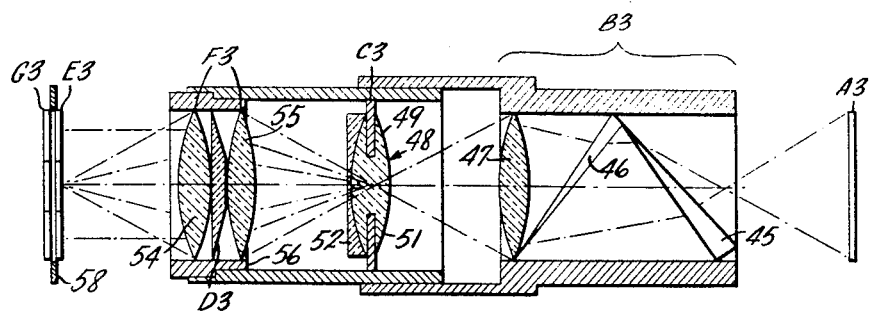
Figure 7:
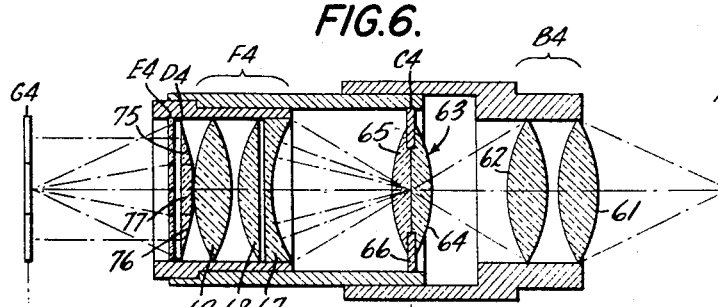

Other modifications of the invention are illustrated in Figs. 5, 6 and 7. The embodiment of Fig. 5 comprises an anamorphic objective lens unit B2, an optical receiving medium C2, a second objective lens F2, a light divider D2 and a set of monochromatic filters E2. The anamorphic objective lense unit B2 is shown the same as the corresponding unit B in Fig. 1. The optical receiving medium C2 comprises a plano-convex lens 37 and masking frame 39 set in a housing 38. The objective lens unit B2 is focused on the lens 37 preferably on the plane face of the latter lens. If desired, the plane face of the lens 37 may be burnished, etched, frosted or coated so as to provide in effect a flat translucent screen on which an image is projected by the lens unit B2. The screen is masked by the frame 39 which is preferably provided with an opening corresponding to the shape and size of the image. The second objective lens F2 is shown as a single lens unit as in Fig. 2 although a multiple unit like that of Fig. 1 may be used, if desired. The light divider D2 and filters E2 are located behind the objective lens F2 instead of in front of it as in Fig. 2. The light divider D2 comprises a block of glass shaped to provide a prism portion 41, a central flat portion 42 of uniform thickness and a second prism portion 43. The prism portions 41 and 43 operate the same as prisms 15 and 16 in Fig. 1. The central portion 42 does not refract the light but has the effect of increasing the optical length of the beam of light passing through the central portion of the objective lens F2 and forming the central image corresponding to image 13 in Fig. 2G. The effective length of the central beam is thereby made substantially the same as the lengths of the upper and lower beams forming images corresponding to images 12 and 14 in Fig. 2G so that all three images are sharply in focus. While the filters E2 are shown behind the light divider D2, it will be understood that they can be in front, it being only necessary that each of the images produced on the film G2 is produced by light passing through a different filter.

The embodiment shown in Fig. 6 comprises an anamorphic objective lens unit B3, an optical receiving medium C3, a second objective lens unit F3, a light divider D3 and a set of monochromatic filters E3. Instead of cylindrical lenses as in the previous embodiments, the anamorphic objective lens unit B3 of Fig. 6 employs two prisms 45 and 46 disposed at an angle to one another so as to effect a compression of the picture in one direction, for example in a vertical direction as shown. The unit B3 further comprises an objective lens 47 which is shown schematically as a bi-convex lens but is preferably a compound lens in accordance with known optical practice. The optical receiving medium C3 is shown as comprising a compound lens 48 masked by a frame 49. As illustrated in Fig. 6, the lens 48 comprises a bi-convex lens element 51 and a plano-concave lens element 52. While the frame 49 is shown as being molded into the bi-convex lens element it may, if desired, be in front of this element or immediately behind the plane face of lens element 52, which may be burnished, etched, frosted, coated or otherwise provided with a velvet surface which is translucent and on which a flat image can be projected by the objective lens unit 53. In this event, the objective lens unit should be focused on the translucent surface instead of on the central plane of the bi-convex lens 48 as illustrated in Fig. 6. The second objective lens unit F3 is shown in Fig. 6 as comprising two lens units 54 and 55 mounted in a housing 56 with 2 prisms of the light divider D3 disposed between the lenses 54 and 55. With this arrangement, all three images on the film G3 are sharply in focus without the need of compensating elements such as described above. Fig. 6 also illustrates a further alternative position of the filter group E3, the filters being shown disposed in the customary window 58 of the film holder.

Figure 7G:
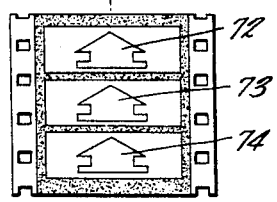
Figs. 7A, 7C and 7G are transverse views of parts designated A4, C4 and G4 in Fig. 7.
Figure 7C:
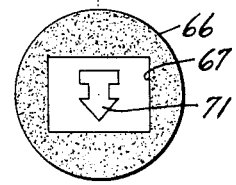
Figure 7A:
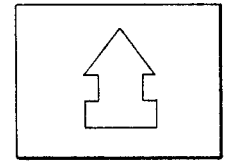

Fig. 7 shows schematically a further embodiment comprising an objective lens unit B4, an optical receiving medium C4, an anamorphic objective lens unit F4, a light divider D4 and monochromatic filters E4. This embodiment differs from those described above in that the front objective lens unit B4 is not anamorphic but rather a conventional objective photographic lens shown as comprising lens elements 61 and 62. The optical receiving medium C4 is shown as comprising a compound lens 63 made up of two plano-convex elements 64 and 65. A masking frame 66 is sandwiched between these lens elements. As illustrated in Fig. 7C, the frame 66 has an opening 67 having the shape of a standard picture frame since the image has not been compressed. The plane face of one of both of the lens elements 64 and 65 may be rendered translucent as described above or a thin sheet or layer of translucent material may be sandwiched between them to provide a translucent "screen" on which a flat image is projected by the objective lens unit B4. The lens unit F4 is an anamorphic objective lens comprising a plano-concave cylindrical lens 67, a plano-convex cylindrical lens 68 and a bi-convex cylindrical lens 69. By reason of the anamorphic properties of the lens group F4, the image 71 on the optical receiving medium C4 (Fig. 7C) is compressed in a vertical direction so that three images 72, 73 and 74 projected by the lens unit on the film G4 occupy the space of a single standard frame as shown in Fig. 7G. The light divider D4 and filter group E4 are shown disposed behind the anamorphic objective lens unit F4, the arrangement in this respect being like that of Fig. 5. The light divider D4 comprises two prisms 75 and 76 and a plain glass block of uniform thickness 77 disposed between the prisms. As in the embodiment of Fig. 5 the glass block 77 equalizes the effective foco paths of the light beams forming the three images 72, 73 and 74 so that all three images are sharply in focus.

The single anamorphic objective lens group F4 of Fig. 7 may be replaced by three anamorphic lenses arranged in parallel with one another like the lenses 21, 22 and 23 of Figs. 1 and 4. Moreover, while it is advantageous to compress the images on the film in a vertical direction as illustrated in Figs. 2G and 7G, thereby obtaining vertically compressed images which make it possible to get all three images of a set in a single standard frame, this feature of the invention may, if desired, be omitted by using conventional objective lenses instead of anamorphic lenses, or different degrees of compression may be used.

When using the optical system in accordance with the invention for viewing, printing or projecting the film G is illuminated by a suitable light source. The light from the three images of each frame passes through the respective filters and the images are recombined by the light divider D. The resulting color image produced on the optical receiving medium C is projected by the objective lens group B onto a projection screen located at the position of the object A.

It will be understood by those skilled in the art that the several individual features of the respective embodiments shown and described are mutually interchangeable insofar as they are compatible. It will be seen that in each embodiment there is an optical receiving medium C, C1 etc. which is disposed at the focus of the objective lens unit B, B1 etc. so that an image is projected on the optical receiving medium and this image is then divided into a plurality of images projected on the film by the second objective lens unit F, F1 etc. As the images projected on the film are all derived from the single image of the optical receiving medium parallax error is avoided. While it is possible to use two or four color separation images if desired, the use of three such images is considered preferably as it makes possible good color reproduction while avoiding an unnecessarily large number of images. Still other changes may be made in the apparatus without departing from the essential nature and purpose of the invention, it being understood that the invention is not limited to the preferred embodiments herein illustrated and particularly described.

What I claim and desire to secure by Letters Patent is:

1. A photographic camera lens system comprising a first objective lens unit and a second objective lens unit spaced from one another and arranged coaxially in tandem, an intermediate convex lens disposed coaxially between said objective lens units, said first objective lens unit being focused on the median transverse plane of said intermediate convex lens so as to project on said plane a primary image of a scene being photographed, said first objective lens unit comprising an anamorphic element reducing one dimension of said image to a unit fraction of said dimension of a normal image of said scene, an opaque frame disposed in said plane and having an elongated opening defining the size and shape of said reduced image, the greater dimension of said opening being smaller than the diameter of said first objective unit and said second objective lens unit being focused on said plane and comprising means for producing a plurality of secondary images of said primary image and for directing on a film said secondary images disposed edge-to-edge with the longer images of said secondary images contiguous, said secondary images having the same proportions as said primary image, and a plurality of monochromatic filters disposed so that the light forming each of said secondary images passes through a different filter.

2. Apparatus according to claim 1, in which said second objective lens unit comprises a plurality of lenses arranged in parallel with one another.

3. Apparatus according to claim 1, in which said second objective lens unit comprises two lens elements arranged in tandem and a light divider disposed between said two elements.

References Cited in the file of this patent

UNITED STATES PATENTS

| | | |
|---|---|---|
| 1,126,689 | Berthon et al. | Feb. 2, 1915 |
| 1,629,974 | Russo | May 24, 1927 |
| 1,873,302 | De Francisco | Aug. 23, 1932 |
| 1,897,752 | Chretien | Feb. 14, 1933 |
| 1,921,918 | Goodwin | Aug. 8, 1933 |
| 2,207,409 | Newcomer | July 9, 1940 |
| 2,358,092 | Luboshez | Sept. 12, 1944 |
| 2,510,419 | Ross | June 6, 1950 |

FOREIGN PATENTS

| | | |
|---|---|---|
| 385,141 | Great Britain | Dec. 22, 1932 |
| 441,907 | Great Britain | Jan. 29, 1936 |
| 460,310 | France | Oct. 2, 1913 |

UNITED STATES PATENT OFFICE

CERTIFICATE OF CORRECTION

Patent No. 2,894,427                                    July 14, 1959

Fernando Alvarez Sabater

It is hereby certified that error appears in the above numbered patent requiring correction and that the said Letters Patent should read as corrected below.

In the grant, lines 1 and 12, name of inventor, for "Fernando Alverez Sabater", each occurrence, read -- Fernando Alvarez Sabater --.

Signed and sealed this 8th day of December 1959.

(SEAL)
Attest:
KARL H. AXLINE
Attesting Officer

ROBERT C. WATSON
Commissioner of Patents